(12) United States Patent
Date

(10) Patent No.: US 11,458,738 B2
(45) Date of Patent: Oct. 4, 2022

(54) IMAGE FORMING APPARATUS AND IMAGE FORMING METHOD

(71) Applicant: Konica Minolta Inc., Tokyo (JP)

(72) Inventor: Masakazu Date, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 22 days.

(21) Appl. No.: 16/899,245

(22) Filed: Jun. 11, 2020

(65) Prior Publication Data

US 2020/0391516 A1    Dec. 17, 2020

(30) Foreign Application Priority Data

Jun. 13, 2019    (JP) .............................. JP2019-110534

(51) Int. Cl.
| | |
|---|---|
| *B41J 29/393* | (2006.01) |
| *B41J 2/21* | (2006.01) |
| *G01J 3/46* | (2006.01) |
| *H04N 1/00* | (2006.01) |
| *H04N 1/60* | (2006.01) |
| *B41J 11/00* | (2006.01) |

(52) U.S. Cl.
CPC .......... *B41J 2/2142* (2013.01); *B41J 11/009* (2013.01); *B41J 29/393* (2013.01); *G01J 3/46* (2013.01); *H04N 1/00023* (2013.01); *H04N 1/00031* (2013.01); *H04N 1/6033* (2013.01); *B41J 2029/3935* (2013.01); *G01J 2003/467* (2013.01)

(58) Field of Classification Search
CPC ...................... B41J 29/393; B41J 2029/3935; B41J 11/009; B41J 2/2142
See application file for complete search history.

(56) References Cited

U.S. PATENT DOCUMENTS

| | | | |
|---|---|---|---|
| 2005/0151985 A1* | 7/2005 | Hisamura | .......... H04N 1/00045 358/1.12 |
| 2008/0030536 A1 | 2/2008 | Furukawa et al. | |
| 2010/0060682 A1* | 3/2010 | Akatsuka | ............... B41J 2/2114 347/9 |

(Continued)

FOREIGN PATENT DOCUMENTS

| | | | |
|---|---|---|---|
| JP | 2002019236 A | | 1/2002 |
| JP | 2005234812 A | | 9/2005 |

(Continued)

OTHER PUBLICATIONS

EPO Extended European Search Report for corresonding EP Application No. 20178390.9, dated Oct. 14, 2020.

(Continued)

*Primary Examiner* — Julian D Huffman

(74) *Attorney, Agent, or Firm* — Cantor Colburn LLP

(57) ABSTRACT

An image forming apparatus includes: a hardware processor that forms an image on a conveyed recording medium; and a determining device that determines whether a type of the recording medium is a first recording medium or a second recording medium, wherein if the type of the recording medium is determined to be the first recording medium, the hardware processor forms a normal image on the recording medium, whereas if the type of the recording medium is determined to be the second recording medium, the hardware processor forms a test image on the recording medium.

9 Claims, 8 Drawing Sheets

(56) References Cited

U.S. PATENT DOCUMENTS

2012/0201549 A1    8/2012    Sakata

FOREIGN PATENT DOCUMENTS

| JP | 2008173877 A | 7/2008 |
| JP | 2015076748 A | 4/2015 |
| WO | 2018225489 A1 | 12/2018 |

OTHER PUBLICATIONS

CNIPA Office Action for corresponding CN Application No. 202010528710.7; dated, Apr. 30, 2021.
CNIPA The Second Office Action for corresponding CN Application No. 202010528710.7; dated Jan. 6, 2022.

* cited by examiner

FIG. 3
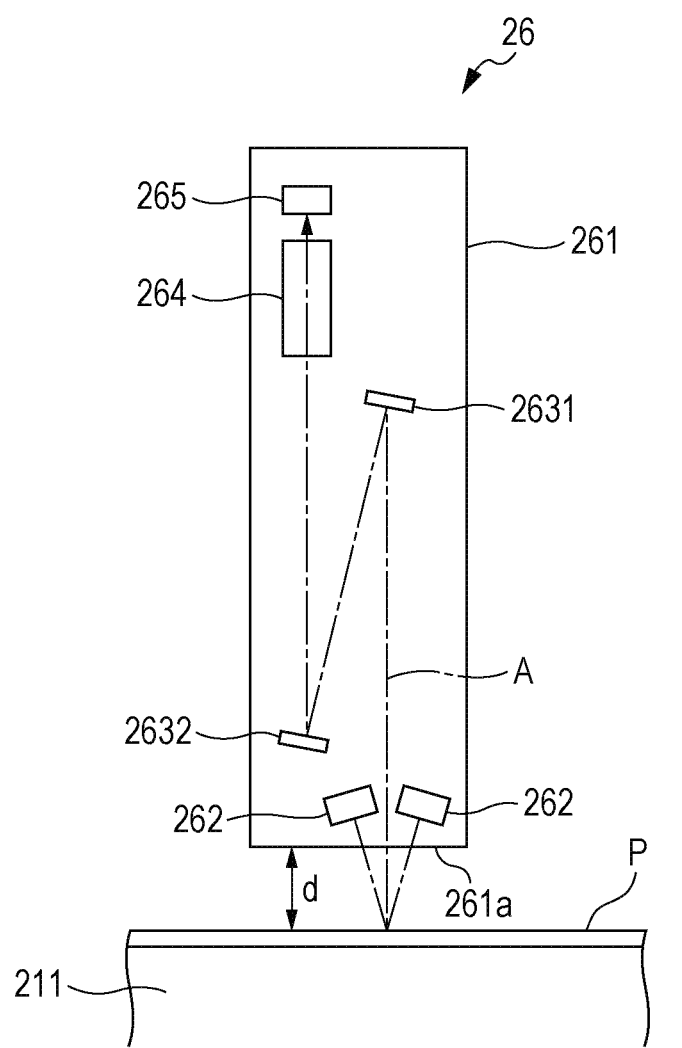
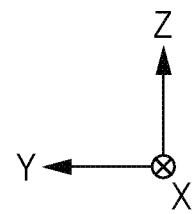

IMAGE FORMING APPARATUS AND IMAGE FORMING METHOD

CROSS REFERENCE TO RELATED APPLICATION

The present application claims priority under 35 U.S.C. § 119 to Japanese Patent Application No. 2019-110534, filed on Jun. 13, 2019, the entire content of which is incorporated herein by reference.

BACKGROUND

Technological Field

The present invention relates to an image forming apparatus and an image forming method.

Description of the Related Art

Conventionally, there has been an inkjet image forming apparatus that forms an image on a recording medium conveyed by a conveying apparatus by ejecting ink from multiple nozzles provided in a print head.

In such an inkjet image forming apparatus, there is a technology to read a predetermined test image formed by a print head by reading means such as a line sensor having multiple image sensors, and detect a defective nozzle having an ink ejection failure on the basis of the obtained imaging data. Ink ejection failures of the nozzles include non-ejection of ink, abnormality of ink ejection amount, and abnormality of ink ejection direction. A defective nozzle is detected on the basis of a missing line pattern or uneven density in a test image.

Note that as a technology related to the reading means in the inkjet image forming apparatus, there has been proposed a technology of calibrating the reading means in order to correct the sensitivity variation in the image sensors and the illuminance unevenness of the light source of the reading means (for example, see JP 2015-76748 A).

In the calibration of the reading means, a white plate whose reflectance is uniform and known is read by the reading means, and a correction value that matches the obtained imaging data with a value corresponding to the reflectance of the white plate is calculated. Then, in the reading of the test image by the reading means, imaging data of the test image as a read result is generated by multiplying the imaging data of the test image by the above correction value. As described above, by using the read result of the test image by the calibrated reading means, the defective nozzle can be appropriately detected.

However, in the conventional inkjet image forming apparatus, there has been a problem that when the type of the recording medium is special paper such as colored paper, aluminum vapor-deposited paper, or transparent paper, for example, in some cases the test image formed on the recording medium cannot be read correctly by the reading means, and therefore a defective nozzle having an ink ejection failure cannot be detected correctly. For example, when the type of recording medium is colored paper, if a similar color ink is formed on the recording medium, the difference between the chromaticity of the recording medium and the chromaticity of the ink is small. Hence, in some cases the test image cannot be read correctly by the reading means. Additionally, when the type of recording medium is aluminum vapor-deposited paper or transparent paper, the surface gloss is high. Hence, the regular reflection light when the light emitted to the recording medium hits the test image increases, while the diffused light decreases. As a result, the amount of diffused light (incident light) to the reading means is reduced, and in some cases the test image cannot be read correctly by the reading means.

SUMMARY

An object of the present invention is to provide an image forming apparatus and an image forming method capable of correctly detecting a defective nozzle having an ink ejection failure.

To achieve the abovementioned object, according to an aspect of the present invention, an image forming apparatus reflecting one aspect of the present invention comprises: a hardware processor that forms an image on a conveyed recording medium; and a determining device that determines whether a type of the recording medium is a first recording medium or a second recording medium, wherein if the type of the recording medium is determined to be the first recording medium, the hardware processor forms a normal image on the recording medium, whereas if the type of the recording medium is determined to be the second recording medium, the hardware processor forms a test image on the recording medium.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a schematic sectional view illustrating a configuration of an image reader;

DETAILED DESCRIPTION OF EMBODIMENTS

Hereinafter, an inkjet image forming apparatus and an image forming method of one or more embodiments of the present invention will be described with reference to the drawings. However, the scope of the invention is not limited to the disclosed embodiments.

Figure 1:
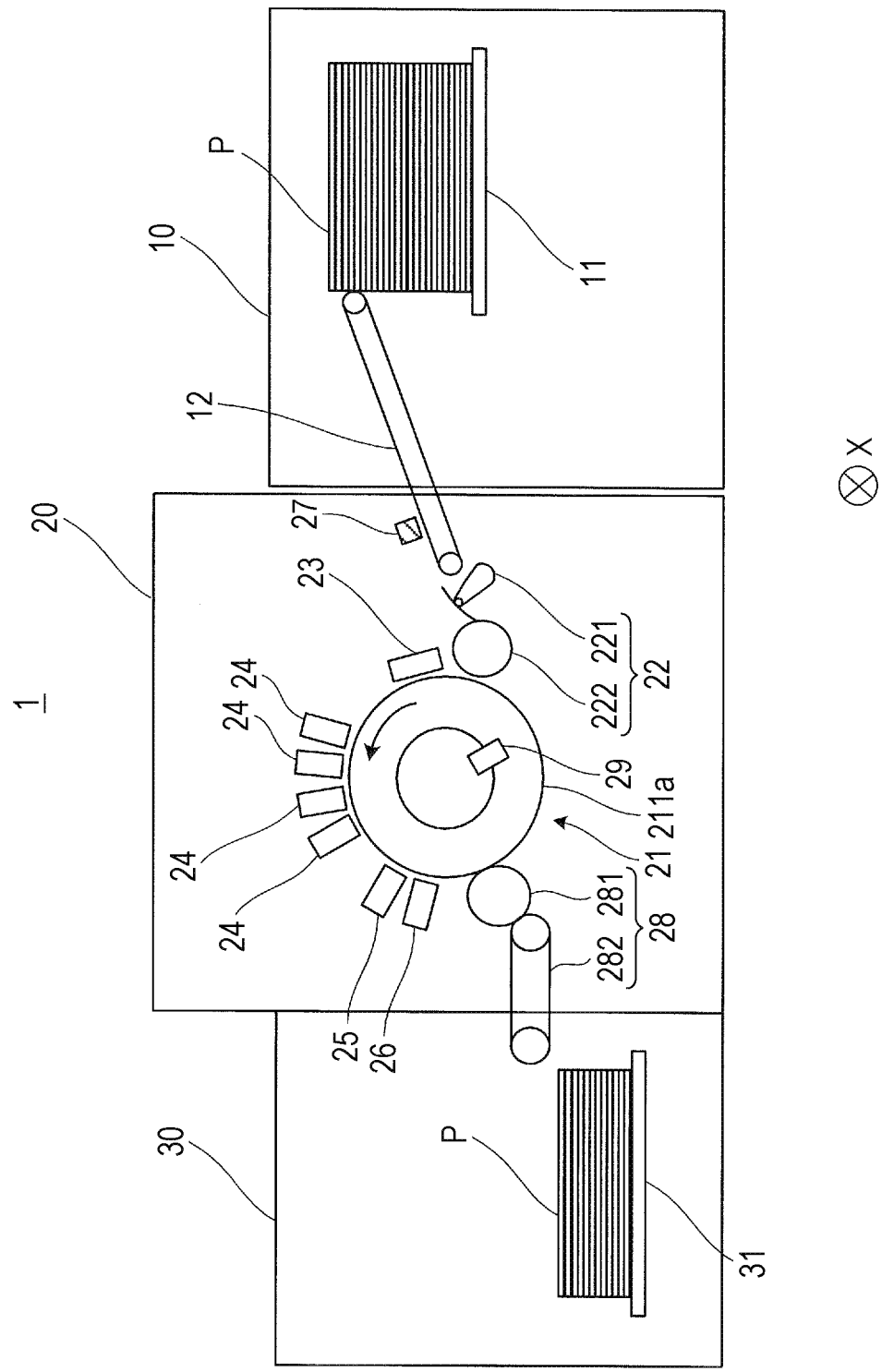
FIG. 1 is a diagram showing a schematic configuration of an inkjet image forming apparatus.

FIG. 1 is a diagram showing a schematic configuration of an inkjet image forming apparatus 1. The inkjet image forming apparatus 1 includes a paper feeder 10, an image forming device 20, a paper discharger 30, and a controller 40 (see FIG. 4).

Under the control of the controller 40, the inkjet image forming apparatus 1 conveys a recording medium P stored in the paper feeder 10 to the image forming device 20, forms an image on the recording medium P in the image forming device 20, and conveys the recording medium P on which the image is formed to the paper discharger 30. As the recording medium P, in addition to paper such as plain paper and coated paper, various media capable of fixing ink that has landed on the surface, such as cloth or sheet-like resin, can be used.

The paper feeder 10 has a paper feed tray 11 that stores the recording medium P, and a medium feeder 12 that conveys and supplies the recording medium P from the paper feed tray 11 to the image forming device 20. The medium feeder 12 includes a ring-shaped belt whose inner side is supported by two rollers. The recording medium P is conveyed to the image forming device 20 from the paper feed tray 11 by rotating the rollers with the recording medium P placed on the belt.

The image forming device 20 has a conveyor 21, a transfer unit 22, a heater 23, a head unit 24, a fixing portion 25, an image reader 26, a delivery portion 28, a rotary encoder 29, and the like. Note that the controller 40 and the head unit 24 function as an "image forming device" of the present invention.

The conveyor 21 holds the recording medium P placed on a conveying surface 211a (placement surface) of a cylindrical conveyor drum 211 (see FIG. 3), and performs a conveying operation of conveying the recording medium P on the conveyor drum 211 in a conveyance direction (direction Y), by rotating the conveyor drum 211 around a rotation axis (cylinder axis) extending in direction X. The conveyor drum 211 includes a claw portion (not shown) and a suction portion (not shown) for holding the recording medium P on the conveying surface 211a. The recording medium P is held on the conveying surface 211a by being pressed at its end portion by the claw portion and being sucked toward the conveying surface 211a by the suction portion. The conveyor 21 is connected to a conveyor drum motor (not shown) for rotating the conveyor drum 211. The conveyor drum 211 rotates by an angle proportional to the rotation amount of the conveyor drum motor.

The transfer unit 22 delivers the recording medium P conveyed by the medium feeder 12 of the paper feeder 10 to the conveyor 21. The transfer unit 22 is provided in a position between the medium feeder 12 of the paper feeder 10 and the conveyor 21, and picks up one end of the recording medium P conveyed from the medium feeder 12 with a swing arm portion 221 and delivers it to the conveyor 21 through a transfer drum 222.

The heater 23 is provided between the arrangement position of the transfer drum 222 and the arrangement position of the head unit 24, and heats the recording medium P conveyed by the conveyor 21 to a temperature within a predetermined temperature range. For example, the heater 23 has an infrared heater or the like, and energizes the infrared heater on the basis of a control signal supplied from the CPU 41 (see FIG. 4) to generate heat by the infrared heater.

The head unit 24 forms an image by ejecting ink to the recording medium P from a nozzle opening provided on an ink ejection surface facing the conveying surface 211a of the conveyor drum 211, at an appropriate timing according to the rotation of the conveyor drum 211 holding the recording medium P. The head unit 24 is arranged such that the ink ejection surface and the conveying surface 211a are separated by a predetermined distance. In the inkjet image forming apparatus 1 of the embodiment, four head units 24 corresponding to four color inks of yellow (Y), magenta (M), cyan (C), and black (K) are arranged at predetermined intervals in the order of Y, M, C, K colors from the upstream side in the conveyance direction of the recording medium P.

Figure 2:
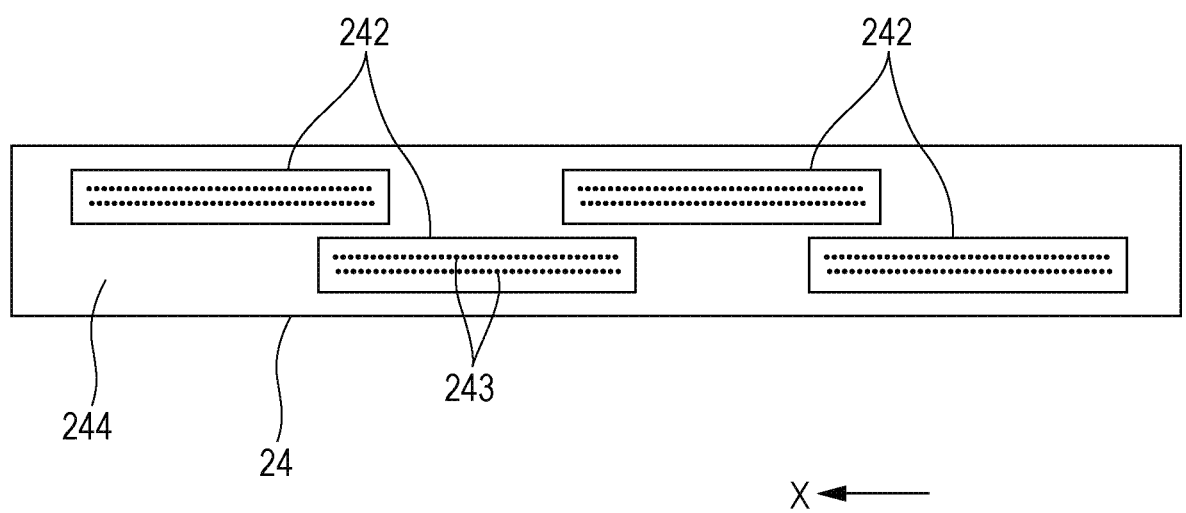
FIG. 2 is a schematic diagram showing a configuration of a head unit.

FIG. 2 is a schematic diagram showing a configuration of the head unit 24. Here, a surface of the head unit 24 that faces the conveying surface 211a of the conveyor drum 211 is shown.

The head unit 24 includes four print heads 242 attached to an attachment member 244. Each of the print heads 242 is provided with multiple recording elements each having a pressure chamber for storing ink, a piezoelectric element provided on a wall surface of the pressure chamber, and a nozzle 243. When a drive signal for deforming the piezoelectric element is input to the recording element, the pressure chamber is deformed by the deformation of the piezoelectric element, the pressure in the pressure chamber is changed, and ink is ejected from the nozzle communicating with the pressure chamber.

In the print head 242, two nozzle rows including the nozzles 243 arranged at equal intervals in a direction intersecting with the conveyance direction of the recording medium P (in the embodiment, direction orthogonal to conveyance direction, i.e., direction X) are formed. The two nozzle rows are provided such that the arrangement positions of the nozzles 243 of one nozzle row are shifted from the arrangement positions of the nozzles 243 of the other row in direction X, by half the arrangement interval of the nozzles 243 in each nozzle array.

Additionally, in the print head 242, there may be a nozzle 243 that has an ink ejection failure (defective nozzle) due to processing variation at the time of forming the nozzle 243, characteristic variation of the piezoelectric element, clogging of the nozzle 243, or blockage due to adhesion of foreign matter to the nozzle opening, for example. A method for detecting a defective nozzle will be described later.

The four print heads 242 are arranged in a zigzag pattern so that the arrangement ranges of the nozzle rows in direction X are connected continuously. The arrangement range in direction X of the nozzles 243 included in the head unit 24 covers the width in direction X of an area where an image is formed on the recording medium P conveyed by the conveyor 21. During image formation, the position of the head unit 24 is fixed with respect to the rotation axis of the conveyor drum 211. That is, the head unit 24 has a line head capable of ejecting ink to the recording medium P over an image formable width in direction X, and the inkjet image forming apparatus 1 is a single-pass inkjet image forming apparatus.

Note that the number of nozzle rows included in the print head 242 may be one, or three or more, instead of two. Additionally, the number of print heads 242 included in the head unit 24 is not limited to four, but may be three or less, or five or more.

As the ink ejected from the nozzles of the recording element, an ink having a property of undergoing a phase change in a gel or sol state depending on the temperature and being cured by irradiation with energy rays such as ultraviolet rays is used. Additionally, in the embodiment, an ink that is in a gel state at room temperature and changes into a sol state when heated is used. The head unit 24 includes an ink heater (not shown) that heats the ink stored in the head unit 24. The ink heater operates under the control of the controller 40, and heats the ink to a sol-like temperature.

The print head 242 ejects the heated sol-like ink. When the sol-like ink is ejected onto the recording medium P, the ink droplets land on the recording medium P and then naturally cool, whereby the ink quickly becomes gel-like and solidifies on the recording medium P.

The fixing portion 25 has a light emitter arranged over the width of the conveyor 21 in direction X, and irradiates the recording medium P placed on the conveyor 21 with energy rays such as ultraviolet rays from the light emitter to cure and fix the ink ejected onto the recording medium P. The light emitter of the fixing portion 25 is disposed to face the conveying surface 211a from the arrangement position of the head unit 24 to the arrangement position of a transfer drum 281 of the delivery portion 28 in the conveyance direction.

The image reader 26 is disposed so as to be able to read the surface of the recording medium P on the conveying surface 211a at a position between the fixing position of ink by the fixing portion 25 and the arrangement position of the transfer drum 281 in the conveyance direction. In the embodiment, the image reader 26 reads the surface of the recording medium P conveyed by the conveyor 21 within a predetermined reading range, and outputs imaging data to the controller 40.

FIG. 3 is a schematic sectional view illustrating a configuration of the image reader 26. FIG. 3 schematically shows the configuration of the image reader 26 in a cross section perpendicular to direction X. The image reader 26 includes a housing 261, a pair of light sources 262 accommodated inside the housing 261, mirrors 2631, 2632, an optical system 264, and a line sensor 265.

The housing 261 is a rectangular parallelepiped member arranged such that one surface faces the conveying surface 211a. The surface of the housing 261 facing the conveying surface 211a is a light transmitting surface 261a formed using a light transmitting member such as glass. Hereinafter, the conveyance direction of the recording medium P at a position facing the light transmitting surface 261a is defined as direction Y, and a direction perpendicular to plane XY is defined as direction Z.

Each of the pair of light sources 262 is a linear light source having multiple light emitting diodes (LEDs) arranged in a range including an area where an image can be formed by the head unit 24 in direction X. The pair of light sources 262 are arranged in opposite positions with respect to a predetermined reference plane A perpendicular to the conveyance direction, and emit light to the recording medium P on the conveying surface 211a through the light transmitting surface 261a of the housing 261. Additionally, the angles of the light sources 262 are adjusted so that, when the distance between the light transmitting surface 261a and the recording medium P on the conveying surface 211a is a predetermined standard distance d, light beams are emitted at the same incident angle on a line of the recording medium P intersecting the reference plane A.

The mirror 2631 has a length corresponding to the arrangement range of the light source 262 in direction X, and, of light emitted from the light source 262 and reflected on the recording medium P, reflects light traveling on the reference plane A in the direction of the mirror 2632. The mirror 2632 is provided in a position closer to the light transmitting surface 261a than the mirror 2631, and reflects the light reflected by the mirror 2631 in the direction of the optical system 264. By providing the mirrors 2631, 2632 in this manner, an appropriate optical path length is secured in the housing 261.

The optical system 264 condenses the incident light from the mirror 2632 to the position of the image sensor of the line sensor 265. The optical system 264 is adjusted so that an image of the surface of the recording medium P is formed at the position of the image sensor of the line sensor 265, that is, the surface of the recording medium P is focused, when the distance between the light transmitting surface 261a and the recording medium P on the conveying surface 211a is the predetermined standard distance d. As the optical system 264, for example, a system can be used in which a large number of graded index lenses that converge incident light at a predetermined position by a refractive index distribution in a direction perpendicular to the optical axis are arranged.

The line sensor 265 has a configuration in which multiple image sensors that output signals according to the intensity of incident light are arranged in direction X. Specifically, in the line sensor 265, the image sensors are provided in three rows in direction X, and the image sensors in each row output signals corresponding to the intensity of red (R), green (G), and blue (B) wavelength components of the incident light. As the image sensors corresponding to R, G, and B, a charge coupled device (CCD) sensor or a complementary metal oxide semiconductor (CMOS) sensor including a photodiode as a photoelectric conversion element, and provided with a color filter that transmits light of an R, G, or B wavelength disposed in the light receiving unit may be used. Note that in the image reader 26, an area sensor may be used instead of the line sensor 265.

The signal output from the line sensor 265 is subjected to current-voltage conversion, amplification, noise removal, analog-to-digital conversion, and the like in an analog front end (not shown), and is output to the controller 40 as imaging data indicating a luminance value of a read image. In the embodiment, the pixel value of the imaging data indicates the intensity of light detection by the image sensor in 256 gradations from 0 to 255.

The delivery portion 28 includes a belt loop 282 having an annular belt whose inside is supported by two rollers, and a cylindrical transfer drum 281 that transfers the recording medium P from the conveyor 21 to the belt loop 282. The recording medium P transferred from the conveyor 21 onto the belt loop 282 by the transfer drum 281 is conveyed by the belt loop 282 and sent out to the paper discharger 30.

The rotary encoder 29 is attached to the conveyor drum 211, and outputs a pulse signal (detection signal) to the controller 40 every time the conveyor drum 211 rotates by a predetermined angle. The configuration of the rotary encoder 29 is not particularly limited, but may include a code wheel that is provided with slits arranged on a predetermined circumference and rotates with the conveyor drum 211, a light emitting portion that emits light to the slit of the code wheel, and a light receiving portion that detects light emitted from the light emitting portion and having passed through the slit, and may output a pulse signal to the controller 40 at the timing when the light is detected by the light receiving portion.

Additionally, the rotary encoder 29 outputs one reference pulse signal to the controller 40 each time the conveyor drum 211 makes one rotation. The controller 40 can acquire the position of the conveyor drum 211 on the basis of the count value of the number of pulse signals input after the input of the reference pulse signal. Additionally, in the embodiment, the count value forms position correspondence information corresponding to a position according to the conveying operation of the conveyor drum 211.

The paper discharger 30 has a plate-shaped paper discharge tray 31 on which the recording medium P sent out from the image forming device 20 by the delivery portion 28 is placed.

Figure 4:
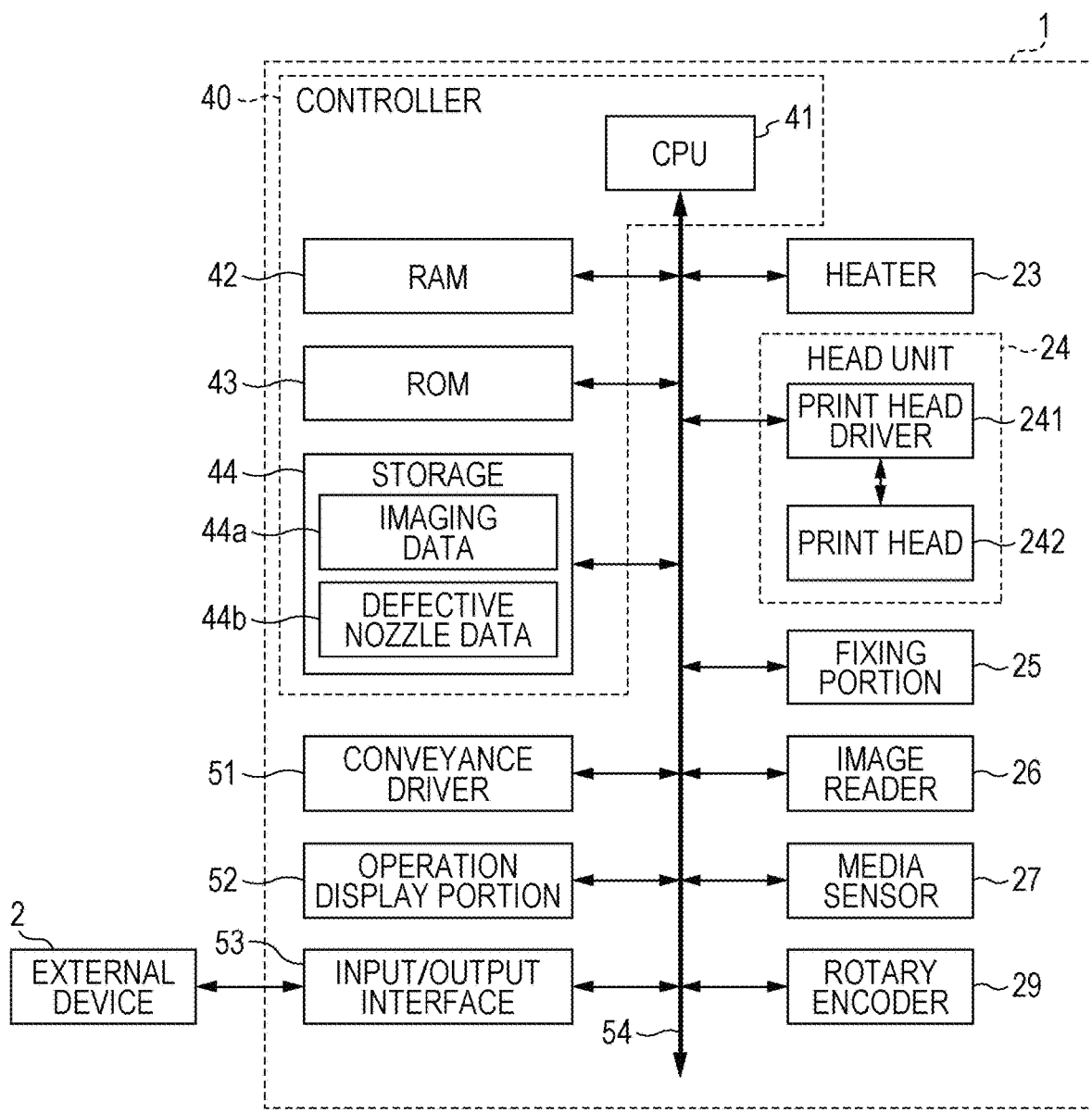
FIG. 4 is a block diagram showing a main functional configuration of the inkjet image forming apparatus.

FIG. 4 is a block diagram showing a main functional configuration of the inkjet image forming apparatus 1. The inkjet image forming apparatus 1 includes the heater 23, a print head driver 241 and print head 242, the fixing portion 25, the image reader 26, the rotary encoder 29, the controller 40, a conveyance driver 51, an operation display portion 52, an input/output interface 53, a bus 54, and the like.

The print head driver 241 supplies a driving signal for deforming the piezoelectric element in accordance with the image data at an appropriate timing to the recording element of the print head 242, so that an amount of ink corresponding to the pixel value of the image data is ejected from the nozzle 243 of the print head 242.

The controller 40 includes a central processing unit (CPU) 41, a random access memory (RAM) 42, a read only memory (ROM) 43, and a storage 44. Note that the controller 40 functions as a "defect detector" and an "image correction device" of the present invention.

The CPU 41 reads various control programs and setting data stored in the ROM 43 and stores them in the RAM 42, and executes the programs to perform various arithmetic processes. Additionally, the CPU 41 controls the overall operation of the inkjet image forming apparatus 1.

The RAM 42 provides a working memory space to the CPU 41 and stores temporary data. The RAM 42 may include a nonvolatile memory.

The ROM 43 stores various control programs executed by the CPU 41, setting data, and the like. Note that a rewritable nonvolatile memory such as an electrically erasable programmable read only memory (EEPROM) or a flash memory may be used instead of the ROM 43.

The storage 44 stores a print job (image forming command) and image data related to the print job input from an external device 2 through the input/output interface 53, test image data as image data of a test chart (test image) used for defective nozzle detection processing described later, imaging data 44a by the image reader 26, defective nozzle data 44b indicating a defective nozzle having an ejection failure, and the like. Among the stored data, the print job includes, in addition to information specifying the image data related to the image to be formed, information (e.g., size and thickness of recording medium P) on the type of the recording medium P on which to form the image. As the storage 44, a hard disk drive (HDD) is used, for example, and a dynamic random access memory (DRAM) or the like may be used in combination.

The conveyance driver 51 supplies a drive signal to the conveyor drum motor of the conveyor drum 211 on the basis of a control signal supplied from the controller 40, and rotates the conveyor drum 211 at a predetermined speed and timing.

Here, the conveyance driver 51 rotates the conveyor drum 211 at a first speed or a second speed higher than the first speed, according to the control signal. The first speed is a speed set in advance as the speed at which the image reader 26 performs reading. The second speed is a speed set in advance as a speed at which the head unit 24 records an image.

Additionally, the conveyance driver 51 supplies a drive signal to a motor for operating the medium feeder 12, the transfer unit 22, and the delivery portion 28 on the basis of a control signal supplied from the controller 40, and enables supply of the recording medium P to the conveyor 21 and discharge of the recording medium P from the conveyor 21.

The operation display portion 52 includes a display device such as a liquid crystal display and an organic EL display, and an input device such as operation keys or a touch panel arranged so as to be superimposed on a screen of the display device. The operation display portion 52 displays various types of information on the display device, converts a user's input operation on the input device into an operation signal, and outputs the operation signal to the controller 40.

The input/output interface 53 mediates transmission and reception of data between the external device 2 and the controller 40. The input/output interface 53 includes any one of various serial interfaces and various parallel interfaces or a combination thereof, for example.

The bus 54 is a path for transmitting and receiving signals between the controller 40 and other components.

The external device 2 is a personal computer, for example, and supplies a print job, image data, and the like to the controller 40 through the input/output interface 53.

Next, a method of detecting a defective nozzle in the inkjet image forming apparatus 1 will be described.

In the inkjet image forming apparatus 1 of the embodiment, detection of a defective nozzle is performed at a predetermined timing or on the basis of a predetermined input operation on the operation display portion 52 by a user. The detection of a defective nozzle is performed by recording a predetermined test chart on the recording medium P, and analyzing imaging data obtained by capturing the test chart with the image reader 26.

Figure 5:
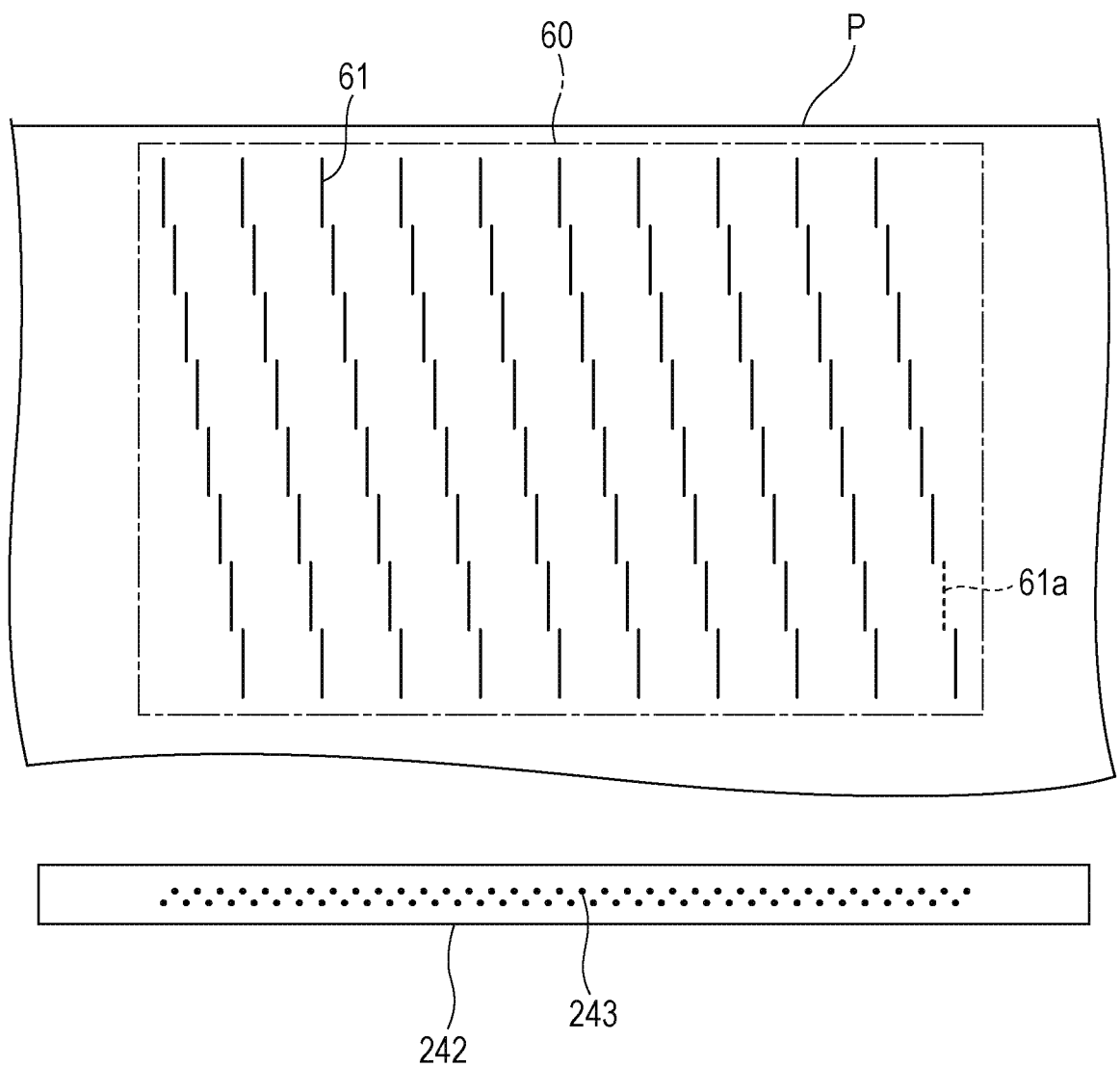
FIG. 5 is a diagram showing an example of a test chart used for detecting a defective nozzle.

FIG. 5 is a diagram showing an example of a test chart used for detecting a defective nozzle. A test chart 60 shown in FIG. 5 is an image formed on the recording medium P by the head unit 24, and includes a line pattern including a multiple lines 61 extending in the conveyance direction.

FIG. 5 shows a portion of the test chart 60 recorded by one print head 242. A similar line pattern is recorded by other print heads 242 of the head unit 24.

Each line 61 of the test chart 60 is formed by ink ejected from a single nozzle 243 of the head unit 24. Additionally, in the test chart 60, the lines 61 recorded by the nozzles 243 adjacent in direction X are recorded so as to be shifted from each other in direction Y, and the lines 61 recorded by every seventh nozzle 243 are recorded in the same position in direction Y.

Since each of the multiple lines 61 in the test chart 60 corresponds to one of the multiple nozzles 243, when an abnormality is recognized in a specific line 61 in the imaging data of the test chart 60 by the image reader 26, the nozzle 243 corresponding to the specific line 61 can be specified as a defective nozzle. For example, when a line 61a shown in FIG. 5 is missing in the imaging data of the test chart 60, the nozzle 243 corresponding to the line 61a is identified as a defective nozzle that does not eject ink.

Additionally, when the density of a specific line 61 is out of a predetermined reference range in the imaging data of the test chart 60, the nozzle 243 corresponding to the specific line 61 is identified as a defective nozzle having an abnormality in the ink ejection amount.

Additionally, when a specific line 61 is not formed within a predetermined range corresponding to the position of the nozzle 243 in the imaging data of the test chart 60, the nozzle 243 corresponding to the specific line 61 is identified as a defective nozzle having an abnormality in the ink ejection direction. When the defective nozzle is identified, the defective nozzle data 44b indicating an array number of the defective nozzle in the head unit 24 is stored in the storage 44.

After the defective nozzle is identified, the print job is stored in the storage 44. When performing an image forming operation of forming an image related to the print job on the recording medium P, the defective nozzle data 44b is referred to, and the image data is corrected so as to complement the ink ejection failure of the defective nozzle. Then, an image is formed on the basis of the corrected image data.

This makes it possible to form an image with an appropriate image quality even when there is a defective nozzle.

Next, a description will be given of defective nozzle detection processing for detecting a defective nozzle and image formation processing using the defective nozzle detection result.

Figure 6:
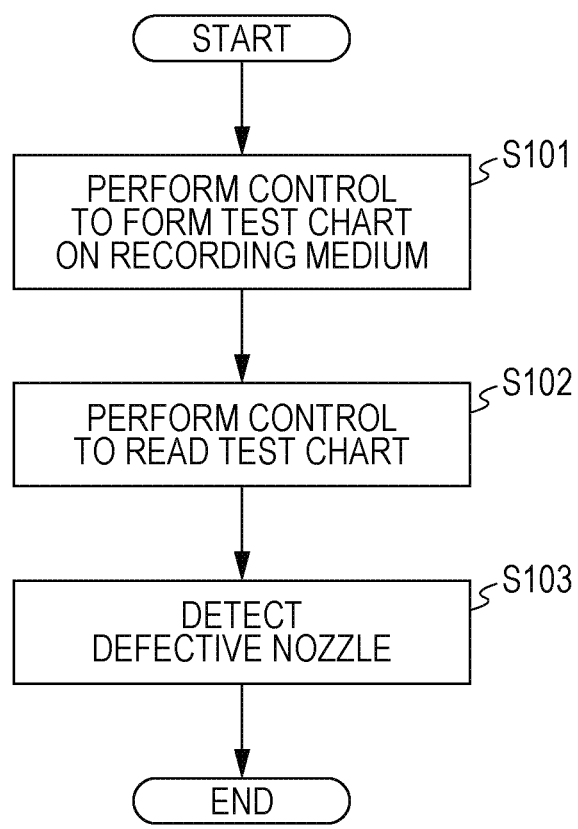
FIG. 6 is a flowchart showing an example of defective nozzle detection processing of the embodiment.

FIG. 6 is a flowchart showing an example of defective nozzle detection processing. The defective nozzle detection processing is executed when a user performs a predetermined input operation for instructing execution of defective nozzle detection on the operation display portion 52. Additionally, the defective nozzle detection processing may be executed at a predetermined timing such as at the time of manufacturing or shipping of the inkjet image forming apparatus 1, or when an image is formed on a predetermined number of recording media P by the inkjet image forming apparatus 1, for example.

First, the controller 40 controls the head unit 24 to form the test chart 60 on the recording medium P (step S101). That is, the controller 40 outputs a drive signal from the conveyance driver 51 to the conveyor drum motor of the conveyor drum 211, and rotates the conveyor drum 211 at the above-described second speed. Then, at an appropriate timing based on the count value of the number of pulse signals output from the rotary encoder 29, the controller 40 supplies test image data related to the test chart 60 stored in the storage 44 from the print head driver 241 to the print head 242, to cause the head unit 24 to eject ink to the recording medium P and form the test chart 60 on the recording medium P.

Additionally, at the timing when the recording medium P to which the ink is applied moves to the position of the fixing portion 25, the controller 40 causes the fixing portion 25 to irradiate the ink with predetermined energy rays to fix the ink onto the recording medium P.

Next, the controller 40 causes the image reader 26 to read the recording medium P on which the test chart 60 is formed (step S102). That is, the controller 40 causes the conveyance driver 51 to output a drive signal to the conveyor drum motor of the conveyor drum 211 to rotate the conveyor drum 211 at the first speed. Additionally, the controller 40 causes the image reader 26 to repeatedly read the test chart 60 on the recording medium P at appropriate timings according to the rotation of the conveyor drum 211, and obtains the imaging data 44a to store it in the storage 44.

Finally, the controller 40 detects a defective nozzle on the basis of the imaging data of the test chart 60 (step S103). That is, the controller 40 specifies the line 61 in which an abnormality is recognized from the imaging data of the test chart 60, and identifies the nozzle 243 corresponding to the line 61 as a defective nozzle. The controller 40 generates the defective nozzle data 44b indicating the array number of the identified defective nozzle in the head unit 24, and causes the storage 44 to store the defective nozzle data 44b. When the processing in step S103 ends, the controller 40 ends the defective nozzle detection processing.

Figure 7:
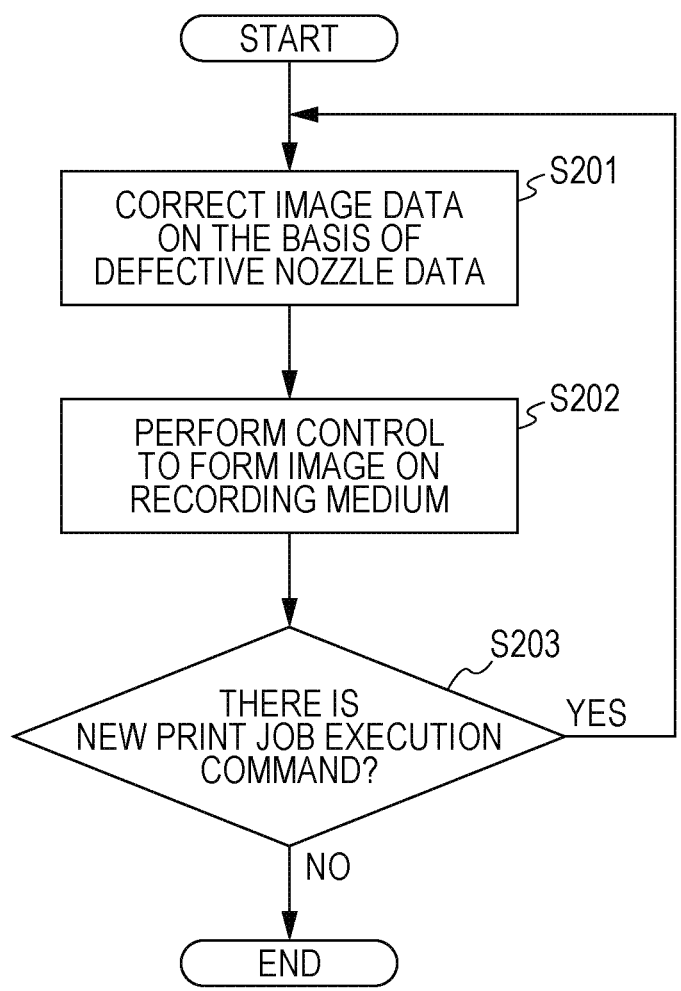
FIG. 7 is a flowchart showing an example of image formation processing according to the embodiment.

FIG. 7 is a flowchart showing an example of the image formation processing. The image formation processing is executed when a print job and image data are input to the controller 40 from the external device 2 through the input/output interface 53. Additionally, prior to the start of the image formation processing, the controller 40 causes the conveyance driver 51 to output a drive signal to the conveyor drum motor of the conveyor drum 211 to start the rotation operation of the conveyor drum 211 at the second speed.

First, the controller 40 corrects image data on the basis of the defective nozzle data 44b (step S201). That is, the controller 40 corrects the image data so that the defective nozzle does not eject ink, and that the non-ejection of ink is complemented by an increase in the amount of ink ejection from the peripheral nozzles 243. The controller 40 causes the storage 44 to store the corrected image data.

Next, the controller 40 causes the head unit 24 to form an image on the recording medium P on the basis of the corrected image data (Step S202). That is, the controller 40 supplies the corrected image data stored in the storage 44 from the print head driver 241 to the print head 242 at an appropriate timing according to the rotation of the conveyor drum 211, to cause the head unit 24 to eject ink to the recording medium P and form an image on the recording medium P.

Additionally, at the timing when the recording medium P to which the ink is applied moves to the position of the fixing portion 25, the controller 40 causes the fixing portion 25 to irradiate the ink with predetermined energy rays to fix the ink onto the recording medium P.

Next, the controller 40 determines whether or not there is a new print job execution command (acquired) (step S203). If it is determined that there is a new print job execution command (step S203, Yes), the controller 40 shifts the processing to step S201.

On the other hand, if it is determined that there is no new print job execution command (step S203, No), the controller 40 ends the image formation processing.

Incidentally, in the above-described inkjet image forming apparatus 1, there has been a problem that when the type of the recording medium P stored in the paper feed tray 11 is special paper such as colored paper, aluminum vapor-deposited paper, or transparent paper, for example, in some cases the test chart formed on the recording medium P cannot be read correctly by the image reader 26, and therefore a defective nozzle having an ink ejection failure cannot be detected correctly. For example, when the type of recording medium P is colored paper, if a similar color ink (e.g., magenta) is formed on the recording medium P (e.g., red), the difference between the chromaticity of the recording medium P and the chromaticity of the ink is small. Hence, in some cases the test chart cannot be read correctly by the image reader 26. Additionally, when the type of recording medium P is aluminum vapor-deposited paper or transparent paper, the surface gloss is high. Hence, the regular reflection light when the light emitted to the recording medium P hits the test charge increases, while the diffused light decreases. As a result, the amount of diffused light (incident light) to the image reader 26 is reduced, and in some cases the test chart cannot be read correctly by the image reader 26.

Hence, in the embodiment, the paper feed tray 11 stores not only the recording medium P (first recording medium) used to form an image (corresponding to "normal image" of present invention), but also a recording medium P (second recording medium) used to form a test chart (corresponding to "test image" of present invention).

The first recording medium is special paper such as colored paper, aluminum vapor-deposited paper, or transparent paper, for example. The second recording medium is a paper other than the special paper (e.g., plain paper or coated paper). When the first recording medium is colored paper, the difference between the chromaticity of the ink ejected from the head unit 24 and the chromaticity of the second recording medium is greater than the chromaticity of the ink and the chromaticity of the first recording medium.

A media sensor 27 (functioning as "determining device" of present invention) that determines whether the type of the recording medium P conveyed by the medium feeder 12 is the first recording medium or the second recording medium is disposed on the upstream side of the head unit 24 in the conveyance direction of the recording medium P (specifically, position above medium feeder 12).

The media sensor 27 includes, for example, a light source LED for light irradiation, a first imaging lens for imaging light of the light source LED, a second imaging lens for imaging light imaged by the first imaging lens and reflected on the surface of the recording medium P, and a CMOS sensor for capturing the imaged reflected light. The light from the light source LED is emitted to the surface of the recording medium P through the first imaging lens, and the reflected light from the surface is condensed through the second imaging lens and imaged at the CMOS sensor.

Every time the recording medium P is conveyed by the medium feeder 12, the media sensor 27 obtains the reflectance of the surface of the recording medium P on the basis of the reflected light captured by the CMOS sensor, and according to the obtained reflectance, determines whether the type of the recording medium P conveyed by the medium feeder 12 is the first recording medium or the second recording medium. For example, the media sensor 27 detects the chromaticity of the recording medium P as the type of the recording medium P. Then, the media sensor 27 outputs the result of the determination to the controller 40.

The controller 40 refers to the determination result output from the media sensor 27, and if it is determined that the type of the recording medium P is the first recording medium, causes the head unit 24 to form an image on the recording medium P on the basis of the image data. On the other hand, the controller 40 refers to the determination result output from the media sensor 27, and if it is determined that the type of the recording medium P is the second recording medium, causes the head unit 24 to form the test chart 60 on the recording medium P on the basis of the test image data related to the test chart 60.

The controller 40 causes the image reader 26 to read the recording medium P on which the test chart 60 is formed, and obtains the imaging data 44a to store it in the storage 44.

The controller 40 detects a defective nozzle on the basis of the imaging data of the test chart 60, generates the defective nozzle data 44b indicating the array number of the defective nozzle in the head unit 24, and stores the defective nozzle data 44b in the storage 44.

The controller 40 corrects the image data on the basis of the defective nozzle data 44b stored in the storage 44. Specifically, the controller 40 corrects the image data so that the defective nozzle does not eject ink, and that the non-ejection of ink is complemented by an increase in the amount of ink ejection from the peripheral nozzles 243.

Figure 8:
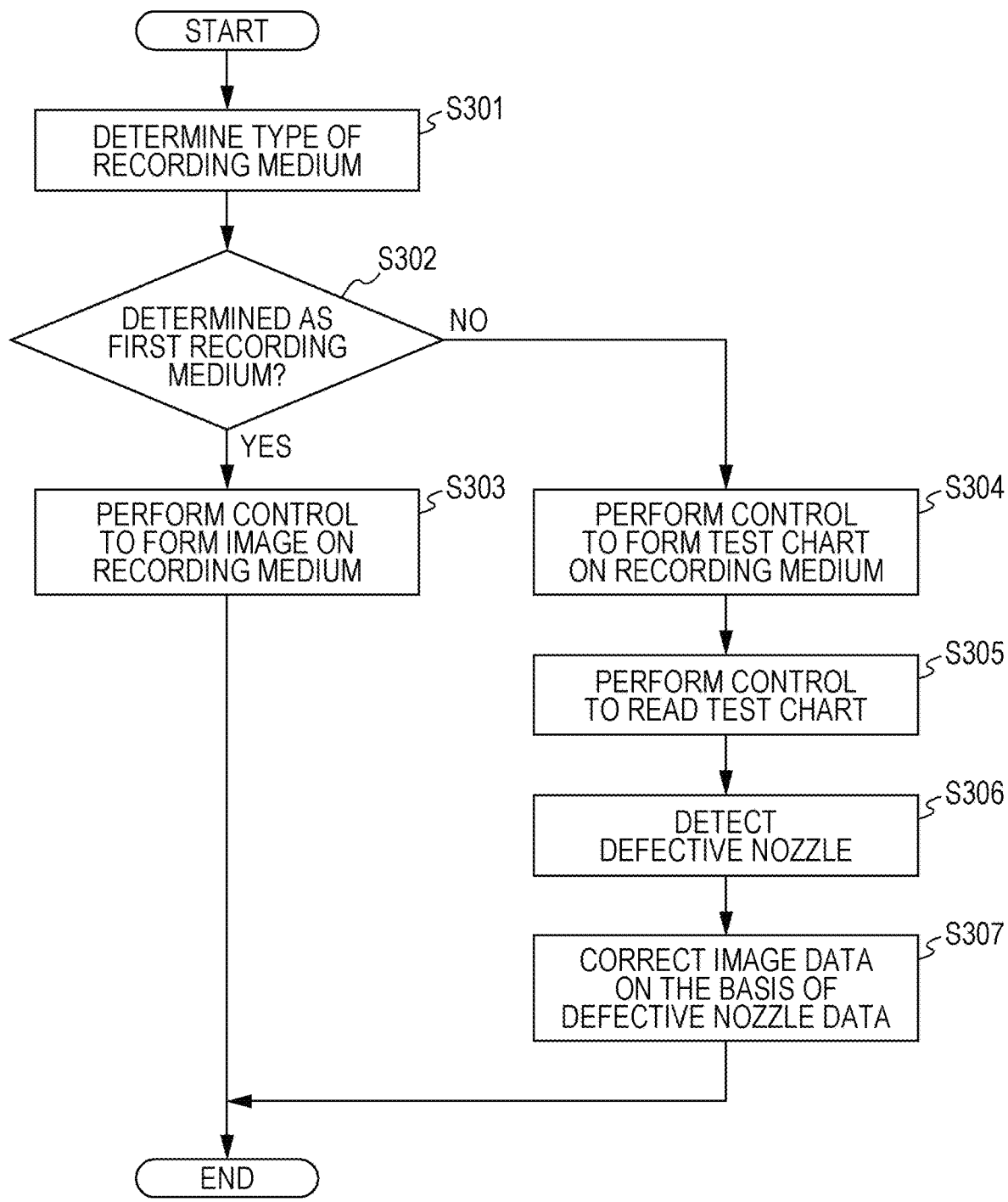
FIG. 8 is a flowchart showing an example of image formation processing and defective nozzle detection processing of the embodiment.

FIG. 8 is a flowchart showing an example of the image formation processing and the defective nozzle detection processing. The image formation processing is executed every time the recording medium P is conveyed by the medium feeder 12 after a print job and image data are input to the controller 40 from the external device 2.

First, the media sensor 27 determines whether the type of the recording medium P conveyed by the medium feeder 12 is the first recording medium or the second recording medium (step S301). Then, the media sensor 27 outputs the result of the determination to the controller 40.

Next, the controller 40 refers to the determination result output from the media sensor 27 and checks whether or not the type of the recording medium P is determined to be the first recording medium (step S302). As a result of the determination, if it is determined that the type of the recording medium P is the first recording medium (step S302, YES), the controller 40 causes the head unit 24 to form an image on the recording medium P on the basis of the image data (step S303). Thereafter, the controller 40 ends the image formation processing and the defective nozzle detection processing.

On the other hand, if it is determined that the type of the recording medium P is not the first recording medium, that is, it is determined that the recording medium P is the second recording medium (step S302, NO), the controller 40 causes the head unit 24 to form the test chart 60 on the recording medium P on the basis of the test image data related to the test chart 60 (step S304).

Next, the controller 40 causes the image reader 26 to read the recording medium P on which the test chart 60 is formed, and obtains the imaging data 44a to store it in the storage 44 (step S305).

Next, the controller 40 detects a defective nozzle on the basis of the imaging data of the test chart 60, generates the defective nozzle data 44b indicating the array number of the defective nozzle in the head unit 24, and stores the defective nozzle data 44b in the storage 44 (step S306).

Next, the controller 40 corrects the image data on the basis of the defective nozzle data 44b stored in the storage 44 (step S307). Thereafter, the controller 40 ends the image formation processing and the defective nozzle detection processing.

As described in detail above, the inkjet image forming apparatus 1 of the embodiment includes:

the head unit 24 (image forming device) that forms an image on the recording medium P by discharging ink from the nozzles 243 to the conveyed recording medium P, and the media sensor 27 (determining device) that determines whether the type of the recording medium P is the first recording medium or the second recording medium. If the type of the recording medium P is determined to be the first recording medium, the head unit 24 forms an image (normal image) on the recording medium P, whereas if the type of the recording medium P is determined to be the second recording medium, the head unit 24 forms the test chart 60 (test image) on the recording medium P.

According to the embodiment configured as described above, if the type of the recording medium P is the first recording medium, an image is formed on the recording medium P, whereas if the type of the recording medium P is the second recording medium, the test chart 60 is formed on the recording medium P. That is, instead of the first recording medium on which an image is formed, the test chart 60 is formed on a second recording medium suitable for image reading by the image reader 26. Hence, the test chart 60 formed on the second recording medium can be correctly read by the image reader 26, and the defective nozzle having an ink ejection failure can be correctly detected on the basis of the imaging data of the test chart 60. Moreover, the image data can be corrected accurately on the basis of the defective nozzle data 44b, and the image quality of the image formed on the first recording medium can be improved.

Note that while the above embodiment describes an example in which the recording medium P sent out from the image forming device 20 by the delivery portion 28 is placed on the paper discharge tray 31, it is desirable that the recording medium P on which an image is formed and the recording medium P on which the test chart 60 is formed be output to a different paper discharge trays 31. With this configuration, when the recording medium P on which an image is formed (first recording medium) and the recording medium P on which a test chart is formed (second recording medium) are discharged to the paper discharger 30, the user does not need to sort the first and second recording media.

Additionally, while the above embodiment describes an example in which the paper feed tray 11 stores the recording medium P (first recording medium) used to form an image and a recording medium P (second recording medium) used to form a test chart, the invention is not limited to this. For example, the first recording medium and the second recording medium may be stored in different paper feed trays 11 (first and second paper feed trays). In this case, the recording medium P (first recording medium) may be conveyed from the first paper feed tray to the image forming device 20, and also, the recording medium P (second recording medium) may be conveyed from the second paper feed tray to the image forming device 20 at a predetermined timing (e.g., every time a predetermined number of first recording media are conveyed).

Additionally, while the above embodiment describes an example in which the media sensor 27 determines whether the type of the recording medium P conveyed by the medium feeder 12 is the first recording medium or the second recording medium depending on the reflectance of the surface of the recording medium P, the present invention is not limited to this. For example, a mark of a predetermined shape may be formed in advance on the second recording medium, and the media sensor 27 may determine whether the type of the recording medium P conveyed by the medium feeder 12 is the first recording medium or the second recording medium by determining whether or not the mark is formed on the recording medium P.

Additionally while the above embodiment describes an example in which the media sensor 27 is disposed above the medium feeder 12, the present invention is not limited to this. For example, the media sensor 27 may be disposed above the paper feed tray 11, more specifically, above the recording medium P stored in the paper feed tray 11.

Additionally, while the above embodiment describes an example in which a defective nozzle is detected using the test chart 60 including the multiple lines 61, the present invention is not limited to this. For example, a gray chart including a gradation pattern formed by the nozzles 243 may be formed as a test image, and a defective nozzle may be detected from density unevenness in a result of reading the gray chart. According to such a gray chart, it is possible to detect an abnormality in the ink ejection direction of the nozzle 243 and easily and appropriately detect an abnormality in the ink ejection amount of the nozzle 243.

Additionally, while the above embodiment describes an example in which the timing when the image reader 26 and the recording medium P face each other is detected on the basis of the count value of the number of pulse signals output from the rotary encoder 29, the present invention is not limited to this. For example, the position of the recording medium P may be directly detected by detecting an end of the recording medium P using the image reader 26 or a reading device separate from the image reader 26.

Additionally, while the above embodiment describes an example in which the image reader 26 reads the recording medium P that is moving by the rotation operation of the conveyor drum 211, and the head unit 24 ejects ink to the moving recording medium P, the present invention is not limited to this. For example, reading of the recording medium P by the image reader 26 and ejection of ink to the recording medium P by the head unit 24 may be performed in a state where the rotation operation of the conveyor drum 211 is temporarily stopped.

Additionally, while the above embodiment describes an example in which the recording medium P is conveyed by the conveyor drum 211, the present invention is not limited to this. For example, the recording medium P may be conveyed by a conveyor belt that is supported by two rollers and moves according to the rotation of the rollers. Alternatively, the recording medium P may be conveyed by a conveying member that reciprocates on the same plane.

Additionally, while the above embodiment describes an example of the single-pass inkjet image forming apparatus 1, the present invention may be applied to an inkjet image forming apparatus that records an image while scanning with a head unit. Alternatively, the present invention may be applied to an inkjet image forming apparatus in which a single nozzle is provided in a head unit.

Additionally, while the above embodiment describes an example of the inkjet image forming apparatus 1 that heats an ink, which is in gel state at room temperature and changes into sol state when heated, to the sol state and injects the ink, the present invention is not limited to this. Various known inks including sol-like or liquid inks at normal temperature may be used.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   an image forming device including a head unit and a controller that forms an image on a conveyed recording medium; and
   a determining device that determines whether a type of the recording medium is a first recording medium or a second recording medium,
   wherein the image forming apparatus is configured such that:
      if the type of the recording medium is determined to be the first recording medium, the image forming device forms a normal image on the recording medium based on image data received by the image forming device, whereas
      if the type of the recording medium is determined to be the second recording medium, the image forming device:
         forms a test image on the recording medium and evaluates the test image for defective nozzle detection;
         corrects the image data received by the image forming device as a result of evaluation of the test image; and
         forms an image on the second recording medium utilizing the corrected image data.

2. The image forming apparatus according to claim 1, wherein
   the determining device detects a chromaticity of the recording medium as the type of the recording medium.

3. The image forming apparatus according to claim 1, wherein
   a difference between a chromaticity of an ink used for forming the image and a chromaticity of the second recording medium is larger than a difference between the chromaticity of the ink and a chromaticity of the first recording medium.

4. The image forming apparatus according to claim 1, wherein
   the image forming device forms an image on the recording medium by ejecting ink from nozzles,
   the image forming device includes an image reader that reads the test image formed on the recording medium, and
   the image forming device detects a defective nozzle having an ink ejection failure on the basis of a read result of the image reader.

5. The image forming apparatus according to claim 1, wherein
   the recording medium on which the normal image is formed and the recording medium on which the test image is formed are output to different paper discharge trays.

6. The image forming apparatus according to claim 1, wherein
   the determining device is disposed on an upstream side of the image forming device in a conveyance direction of the recording medium.

7. The image forming apparatus of claim 1 further wherein the type of the recording medium is determined to be the first recording medium if the medium is special paper comprising colored paper, aluminum paper, vapor deposited paper or transparent paper, and wherein the image forming device is structured to form a normal image on the first recording medium based on image data received by the image forming device, and further wherein the type of the recording medium is determined to be the second recording medium if the medium is plain paper or coated paper and the image forming device is structured to form a test image on the second recording medium for defective nozzle detection.

8. An image forming method of an image forming apparatus that forms an image on a conveyed recording medium, the method comprising:
   determining whether a type of the recording medium is a first recording medium or a second recording medium; and
   if the type of the recording medium is determined to be the first recording medium, forming a normal image on the recording medium based on image data received by the image forming apparatus, whereas
   if the type of the recording medium is determined to be the second recording medium:
      forming a test image on the recording medium and evaluating the test image for defective nozzle determination;
      correcting the image data received by the image forming device as a result of evaluation of the test image; and
      forming an image on the second recording medium utilizing the corrected image data.

9. The image forming method of claim 8 further comprising:
   determining whether a type of the recording medium is a first recording medium if the medium is special paper comprising colored paper, aluminum paper, vapor deposited paper or transparent paper;
   or determining whether a type of the recording medium is a second recording medium if the medium is plain paper or coated paper; and
   if the type of the recording medium is determined to be the first recording medium, forming a normal image on the recording medium based on image data received by the image forming apparatus, whereas if the type of the recording medium is determined to be the second recording medium, forming a test image on the recording medium for defective nozzle determination.

* * * * *